United States Patent [19]

Muller

[11] 4,329,262
[45] May 11, 1982

[54] INITIALLY ERASABLE INK COMPOSITION FOR A BALL POINT WRITING INSTRUMENT

[75] Inventor: Frank A. Muller, West Los Angeles, Calif.

[73] Assignee: Scripto, Inc., Doraville, Ga.

[21] Appl. No.: 247,363

[22] Filed: Mar. 25, 1981

[51] Int. Cl.$^3$ .......................... C09D 3/36; C08L 9/00
[52] U.S. Cl. ..................................... 523/161; 106/30; 106/32; 260/DIG. 38; 401/209; 524/526
[58] Field of Search .......... 260/5, DIG. 38, 33.6 AQ; 106/30, 32

[56] References Cited

U.S. PATENT DOCUMENTS

| | | |
|---|---|---|
| 2,715,388 | 8/1955 | Cofield et al. |
| 2,833,736 | 5/1958 | Glaser ............................... 260/29.6 |
| 2,852,397 | 9/1958 | Goessling ............................ 106/31 |
| 2,853,972 | 9/1958 | Cofield . |
| 2,956,038 | 10/1960 | Juelss et al. ........................ 260/33.6 |
| 3,099,252 | 7/1963 | Cofield . |
| 3,425,779 | 2/1969 | Fisher et al. ......................... 401/190 |
| 3,875,105 | 4/1975 | Daugherty et al. ............ 260/33.2 R |
| 4,097,290 | 6/1978 | Muller et al. ......................... 106/30 |

FOREIGN PATENT DOCUMENTS 55-152769 11/1980 Japan .......................... 260/DIG. 38

*Primary Examiner*—Wilbert J. Briggs, Sr.
*Attorney, Agent, or Firm*—Newton, Hopkins & Ormsby

[57] ABSTRACT

An initially erasable ink composition for a ball point writing instrument which ink is characterized by its initial erasability by ordinary pencil erasers when applied by a ball point writing instrument to an absorbent paper-like writing surface and which thereafter develops permanence. The ink composition comprises an elastomer selected from the group consisting of natural rubbers, synthetic rubbers and mixtures thereof, pigment, and a solvent system for said elastomer and pigment. The elastomer is present in the range of about 18–28% by weight of the ink and the pigment is present in the range of about 10–22% by weight of the ink. The solvent system comprises a volatile component present in the range of about 8–30% by weight of the ink and having a boiling point less than about 180° C. and an essentially non-volatile component which is predominantly a low viscosity hydrocarbon oil, essential oil, petroleum derivative, plasticizer or mixtures thereof having a boiling point less than about 300° C. and greater than about 180° C. being present in the range of about 21 to 50.5% by weight of the ink. The solvent system may also include up to 15% by weight of the ink composition of a non-volatile high viscosity material having a boiling point greater than about 300° C.

22 Claims, No Drawings

INITIALLY ERASABLE INK COMPOSITION FOR A BALL POINT WRITING INSTRUMENT

BACKGROUND OF THE INVENTION

1. Field of the Invention

The present invention pertains to the composition for an initially erasable ink for a ball point writing instrument which ink is characterized by its initial erasability by ordinary pencil erasers when applied by a ball point writing instrument to an absorbent paper-like writing surface and which thereafter develops permanence.

2. Description of the Prior Art

Many frequently interrelated factors must be taken into account in the formulation of a writing medium. These factors fall into two categories, namely, those which stem from the type writing instruments to be used in dispensing the writing medium onto the writing surface, and those which are concerned with the desired characteristics that the writing medium possesses after being dispensed.

The principal type of writing instrument that is to be used with the ink composition of the present invention is a ball point writing instrument.

Insofar as the characteristics of the writing medium in the "after dispensed" state are concerned, appearance and relative indelibility are the most important. In most cases, the appearance of the writing medium means little more than the color of the written line. Indelibility is related to the ease of removal of the written line. Thus, an indelible writing medium is one which is resistant to removal from the writing surface. Obtainment of a high degree of indelibility is not always necessarily desirable. In some instances one may want a writing medium which immediately is not easily removable by mechanical means from the writing surface, which in other instances one may want a writing medium which at least initially is easily removable but which may attain permanence or indelibility over an extended period of time, as for example, over a period of hours. If such a medium is to be considered as being truly erasable, it must be readily removable at least during an initial period of time from the substratum to which it has been applied without any damage of any significant degree to the area of the substratum involved.

In order to understand the nature of this invention, consideration must first be given to the conditions which the formulator of an erasable writing medium must avoid. This in turn requires at least an elementary knowledge of the structure of paper, since paper is the substratum most commonly employed as a writing surface.

Paper is essentially a mat of randomly oriented cellulose fibers. Thus, paper consists of solid structural members, namely the cellulose fibers, having numerous minute voids therebetween. From the description, it may readily be seen that the formulator or designer of an erasable writing medium must prevent the colorant portion of the medium from penetrating to any substantial degree into the voids in the surface being written upon because if there is substantial penetration into the voids the subsequent removal of the colorant by mechanical means cannot be accomplished without damage to the writing surface. Likewise, it may readily be seen that for a writing medium to be erasable, the colorant particles must be prevented from affixing themselves with any substantial degree of permanence, either by chemical reaction or as a result of mere physical attraction, to the solid members of the paper substratum.

In the past, attempts to achieve an erasable writing medium for a ball point pen usually have been unsuccessful. Of course, one may use a superabrasive eraser to remove ordinary ball pen inks from the paper substratum normally used for writing purposes. As discussed above, such substratum is porous to some degree and the ball pen inks in ordinary usage tend to penetrate those pores. In addition, the colorants in such inks tend to affix themselves to the fibers which constitute the solid portion of the substratum. Therefore, the only way to erase markings made with ordinary ball pen inks is to physically remove a substantial number of the fibers in the vicinity of the markings. As a result, the paper substratum is generally so damaged during the erasure process that it is rendered unsuitable for any further use as a writing surface.

Attempts have been made to modify ordinary ball pen ink so as to prevent the colorant portion thereof from penetrating the pores of the paper substratum. These attempts consisted of substituting pigment-type colorants for the dye-type colorants normally used in ball pen inks. The reasoning behind this approach was that since pigment-type colorants normally have a greater particle size than dye-type colorants, the pigment-type colorants would become substantially immobile on deposition upon the surface of the paper substratum and, therefore would not tend to penetrate into the pores of the paper. However, this line of reasoning overlooked the fact that in a ball point writing instrument, the ink is dispensed through a very minute clearance between the ball and socket and that any pigment-type particle which is small enough to be so dispensed will tend to behave as if it were a dye-type particle. Therefore, the colorant portion of such inks was not immobilized to any significant degree and as a consequence, no substantial advantage was gained through substituting the pigment-type colorant for the dye-type colorant in ordinary ball pen inks insofar as erasability was concerned.

As stated above, if a writing medium is to be erasable, the colorant content therein, after being dispensed onto the paper substratum, must remain in such a location that it can be readily removed therefrom with a substantially non-abrasive eraser. Further, the colorant must not be allowed to affix itself either through chemical reaction or through ordinary physical attraction with any substantial degree of permanence to the written-upon surface. If these objectives are to be accomplished, the colorant content of the writing medium must be prevented from penetrating the pores of the substratum and must be shielded from intimate contact with the solid members of the writing surface. Further, if such a medium is to be dispensable from a ball point pen, it follows that the medium must possess physical characteristics which do not differ widely from those of ordinary ball pen inks.

Some success has been achieved in producing erasable ball point pen inks that are transitorily erasable, for example, my prior U.S. Pat. No. 4,097,290 hereinafter referred to as Muller et al. and U.S. Pat. No. 3,875,105 to Daugherty et al. Both of these patents teach the use of an elastomer. The Daugherty et al. patent teaches polyvinyl methyl ether and the parent application thereof, Ser. No. 751,759, teaches Natsyn 2200 which is a synthetic rubber having a chemical structure like natural rubber, while my prior Muller et al. patent teaches natural rubber or rubber which essentially duplicates the chemical structure of natural rubber. Both patents disclose the use of a volatile solvent. At this point it should be noted that the term "solvent" is being used herein as a general term of art and not in its specific technical sense to describe the vehicle into which large elastomer molecules, which may tend to remain in small clusters, are distributed and wherein the vehicle serves to carry the elastomer molecules from within a ball pen cartridge onto the substrate.

Daugherty et al. discloses the volatilizing component as being a solvent for the polyvinyl methyl ether matrix and having an evaporation rate of 3 to 15 on a relative numerical scale on which ethyl ether is assigned an evaporation rate of 1. Daugherty et al. also teaches the possible inclusion of non-volatile solvents for use as pigment dispersing agents or viscosity adjustment solvents. My prior Muller et al. patent discloses a volatile low boiling organic solvent for the elastomer having a boiling point less than 180° C. and exhibiting 100% evaporation within 60 minutes in combination with a non-volatile organic liquid solvent having a high boiling point in excess of 300° C. In summary, both my prior Muller et al. patent and the Daugherty et al. patent teach an erasable ink that includes the following: (1) the use of a pigment as a colorant; (2) an elastomer; and (3) the use of mixtures of volatile and non-volatile solvents.

The below-listed prior U.S. patents are made of record herein under 37 C.F.R. §1.56:

| U.S. PAT. NO. | ISSUE DATE | INVENTOR |
| --- | --- | --- |
| 2,715,388 | August 16, 1955 | Cofield, Jr., et al. |
| 2,833,736 | May 6, 1958 | Glasser |
| 2,852,397 | September 16, 1958 | Goessling |
| 2,852,398 | September 16, 1958 | Goessling |
| 2,853,972 | September 30, 1958 | Cofield, Jr. |
| 2,956,038 | October 11, 1960 | Juelss et al. |
| 3,099,252 | July 30, 1963 | Cofield, Jr. |
| 3,425,779 | February 4, 1969 | Fisher et al. |
| 3,875,105 | April 1, 1975 | Daugherty et al. |
| 4,097,290 | June 27, 1978 | Muller et al. |

SUMMARY OF THE INVENTION

An initially erasable ink composition for a ball point writing instrument which ink is characterized by its initial erasability by ordinary pencil erasers when applied by a ball point writing instrument to an absorbent paper-like writing surface and which thereafter develops permanence. The ink composition comprises a rubber-like elastomer, pigment, and a solvent system for said rubber-like elastomer said solvent system comprising a volatile component and an essentially non-volatile component, said volatile component having a boiling point less than about 180° C. and being present in an amount of at least 8% by weight of the ink, and said essentially non-volatile component having a boiling point less than about 300° C. and greater than about 180° C. and being present in an amount of at least 21% by weight of the ink. The essentially non-volatile component is a low viscosity hydrocarbon oil, essential oil, petroleum derivative, plasticizer or mixtures thereof. The solvent system may include up to 15% by weight of the ink composition of a non-volatile higher viscosity material having a boiling point greater than about 300° C., however it is preferred to limit the presence of such a high boiling component to less than 5% by weight of the ink.

Therefore, it is the object of the present invention to produce an erasable ball point ink composition that possesses very smooth writing characteristics and that becomes permanent quicker, i.e., within hours, without compromising its short term erasability by ordinary pencil erasers.

It is the further object of the present invention to restrict the presence of any non-volatile component of the solvent system having a viscosity substantially above 15 cps and a boiling point above 300° C. to an amount less than 15% and preferably less than 5% of the weight of the ink.

It is still a further object of the present invention that the rubber-like elastomer is selected from the group consisting of natural rubbers, synthetic rubbers and mixtures thereof and preferably is a mixture of natural and synthetic rubbers in approximately equal amounts and is present in an amount in the range of about 18–28% by weight of the ink.

DESCRIPTION OF THE ILLUSTRATIVE EMBODIMENTS

Smoother writing erasable ball-pen inks of the present invention have been prepared that eventually become permanent quicker and more efficiently without compromising short-term erasability with a pencil eraser by using very low viscosity solvents (1.0–15 cps) such as light bodied oils that are further characterized by having boiling points or ranges between 180° C. and 300° C. at atmospheric pressure. Furthermore, the content of vehicles whose viscosities are above 15 cps and that boil above 300° C. is minimized, and when used are employed in amount less than 15 percent by weight of the total ink composition.

The purpose of my study was to define the role of these very low viscosity solvents in terms of comparing their effect on ink performance to oils and plasticizers that are significantly more viscous and that boil above 300° C. More specifically, erasable ball-pen inks (particularly those that depend on very volatile solvents to confer erasability using rubbery elastomers) undergo rapid changes in viscosity as the ink film leaves the cartridge via the ball socket onto the writing paper. The performance of higher viscosity oils and plasticizers, although useful for pigment dispersion as dispersants or plasticizers for rubbery elastomers and as aids to achieving eventual ink permanence, show a direct relationship between their much higher viscosity and the perceived decrease in writing smoothness and the increased length of time required to achieve satisfactory permanence.

The performance of erasable ball-pen inks utilizing essentially non-volatile solvents, such as hydrocarbon oils, boiling between 180° and 300° C. and having significantly lower viscosities than the rubber compatible oils and plasticizers that boil above 300° C. heretofore employed has shown to be in good agreement with the predictions of the equation $(dv/dx) = (F/A)/V$.* Inks so prepared are smoother and achieve eventual permanence quicker without compromising short-term erasability, pigment dispersion and long term ink stability.

*The above formula is a standard physics formula describing the force necessary to remove a substance from a revolving ball, where:

dv = rate of change of velocity.
dx = rate of change of distance.
F = force.
A = area.

V = viscosity.

Shear stresses between the exposed ball and socket rim are efficiently reduced if the elastomer pigment matrix is flowing through the pen tip immersed in very low viscosity liquids (1–15 cps) rather than in relatively thicker vehicles (58–104 cps) such as dioctyl phthalate, diisodecyl phthalate, or heavy mineral oils. It should be noted that the quantity of preferred volatile solvents (those boiling at about 94°–120° C. and evaporating in less than about 8 minutes) is rapidly diminishing as the ink film passes the socket rim onto the exposed surface of the ball.

In other words, a relatively non-volatile oil such as 2257 from Penreco, which has a viscosity about 39 times less than dioctyl phthalate, offers the rubbery pigment matrix less resistance to flow with the concurrent perception of increased writing smoothness. Through the mechanism of capillarity, the elastomer/pigment-oil matrix also incurs less resistance in penetrating surface paper fibers, again with the resulting decrease in the length of time required to achieve the desired degree of permanence. It should be noted that the rate of capillary absorption is inversely proportional to the viscosity.

Other advantages of using low viscosity essentially non-volatile solvents besides those discussed above are: less stringing, resulting in a cleaner line; less tendency to transfer because of increased penetration of ink into paper; and less tendency of increased writing drag because low viscosity oils or solvents insure against the negative effects of elastomer molecular weights that are higher than the optimum desired values for satisfactory ink manufacturing.

The acceptable range of components for the present invention has been found to be as follows:

TABLE I
ACCEPTABLE RANGES OF COMPONENTS

| Components | Selected Type | % Amount by Weight |
|---|---|---|
| Elastomeric Polymer | Natsyn 2205 (synthetic rubber) and/or SMR 5CV60 (natural rubber) | 18–28 |
| Colorant | Pigment | 10–22 |
| Volatile Solvent | One compatible with Polyisoprene and having a boiling point less than 180° C., such as Lacquer Diluent #6 | 8–30 |
| Non-volatile low viscosity solvent having a boiling point at atmospheric pressure from 180° C. and less than 300° C. | Hydrocarbon Oil, Essential Oil, Petroleum Derivative, Plasticizer or Mixtures Thereof | 21–50.5 |
| Non-volatile high viscosity solvent or a plasticizer having a boiling point at atmospheric pressure above 300° C. | Heavy Mineral Oil or Plasticizer | 0 to less than 15 |
| Lubricants | Fatty Acids | 0–5 |

The preferred range of components, percent by weight of the ink, has been found to be as follows: elastomeric polymer 23–26%, colorant 18–20%, volatile solvent 19–21%, non-volatile low viscosity solvent 26–31%, non-volatile high viscosity solvent less than 5%, and lubricants 2–3%.

The elastomer is selected from the group consisting of natural rubbers, synthetic rubbers and mixtures thereof and preferably is a mixture of natural and synthetic rubbers in approximately equal amounts. It is preferable that the elastomeric material or materials chosen exhibit a predetermined substantially uniform molecular weight distribution over a wide molecular range of about 100,000 to 900,000. Insurance against material or process variability may be provided by using 50/50 mixtures of Natsyn 2205 and SMR 5CV60, synthetic and natural rubbers respectively.

Examples of suitable pigments include Victoria Blue, Alkali Blue, Phthalo Blue, Lithol Red, Red 2B, graphite, carbon black and Diarylide Yellow. The suppliers of such pigments are as follows:

TABLE 2
SUITABLE PIGMENTS AND THEIR SUPPLIERS

| Pigment | Supplier and Location |
|---|---|
| Victoria Blue | E. I. DuPont Wilmington, Delaware |
| Alkali Blue | Sherwin-Williams Co. Cleveland, Ohio |
| Lithol Red | Hilton Davis Cincinnati, Ohio |
| Graphite | Acheson Colloid Co. Port Huron, Michigan |
| Carbon Black | Cities Co. Akron, Ohio |
| Red 2B, Phthalo Blue and Diarylide Yellow | BASF Corp. Holland, Michigan |

Other colors will, of course, require the use of other pigments and there is no intent to limit the pigments to those listed. The only requirements of the pigments are that they import the desired color to the ink and that they are sufficiently fine to readily pass through the clearance between the ball and retaining lip of the ball point; i.e., approximately 5 microns or less.

A preferred low boiling point or volatile solvent is Lacquer Diluent #6 supplied by Chem Central Company of Chicago, Illinois which has the property of being compatible with polyisoprene and has a boiling point between 94° C.–120° C. Suitable volatile solvents for the purpose of the present ink composition are considered to be those compatible with rubber having a boiling point less than 180° C. at atmospheric pressure and evaporating in less than 60 minutes. Included among the suitable volatile solvents are V M & P Naphtha having a boiling point range of 121°–139° C. and 100% evaporation in 8.3 minutes, 360–66 Naphtha having a boiling point range of 154°–173° C. and 100% evaporation in 42.1 minutes, as well as very volatile solvents such as hexane and pentane.

Suitable non-volatile low viscosity solvents include liquids having a viscosity within the range of 1–15 cps and having a boiling point less than about 300° C. and greater than about 180° C. and particularly include light bodied oils such as hydrocarbon oils and light mineral oils boiling between 180° C. and 300° C. and having a viscosity around 1.5 centipoise which viscosity is sufficiently low as to result in a final ink viscosity of between 1,000,000 and 4,000,000 centipoise. A preferred example would be Penreco 2257 oil, a product of Penreco, headquartered in Butler, Pennsylvania, a division of Pennzoil Company of Houston, Texas. Penreco 2257 oil has a viscosity of 1.5 centipoise at 25° C. and a boiling range of about 220° C. to 260° C. However, the non-volatile low viscosity component may also be a petroleum derivative such as kerosene having the aforesaid low viscosity and low boiling point; a low viscosity, low boiling point essential oil such as pine oil, a terpene alcohol; or this component may be a low viscosity, low boiling point plasticizer such as dimethyl phthalate and KODAFLEX (TXIB) marketed by Eastman Kodak Company, Kingsport, Tennessee. Table 3 below presents a listing of the physical properties of such suitable non-volatile low viscosity components, including 2257 oil.

TABLE 3
PHYSICAL PROPERTIES OF SUITABLE NON-VOLATILE LOW VISCOSITY COMPONENTS

| MATERIAL | VISCOSITY | BOILING RANGE | VOLATILITY |
|---|---|---|---|
| | (25° C.) | (760 mm) | (100% Evaporation rate*) |
| 2251 Oil | 1.45 cps | 190–260° C. | >1200 minutes |
| 2257 Oil | 1.50 cps | 222–260° C. | >1200 minutes |
| Kerosene | 1.50 cps | 164–279° C. | >1200 minutes |
| Pine Oil | 1.50 cps | 206–220° C. | >1200 minutes |
| Magie 470 Oil | 1.55 cps | 239–269° C. | >1200 minutes |
| Magie 543 Oil | 1.60 cps | 236–277° C. | >1200 minutes |
| Kodaflex (TXIB) | 2.0 cps | 278° C. | slow >2000 minutes |
| Dimethyl Phthalate | 13.6 cps | 282° C. | slow >2000 minutes |

*As measured on a Shell "EvapoRater".

A suitable non-volatile, high viscosity solvent or plasticizer may be chosen from any one of the compounds listed in Table 4 below, but typically include plasticizers and heavy mineral oils having boiling points in excess of 300° C.

TABLE 4
PHYSICAL PROPERTIES OF TYPICAL HIGH VISCOSITY COMPONENTS

| MATERIAL | VISCOSITY | BOILING POINT | VOLATILITY |
|---|---|---|---|
| D15 Mineral Oil | 58 cps | 385° C.* | very slow > 5000 min. |
| Dioctyl Phthalate | 58 cps | 386° C. | very slow > 5000 min. |
| Gulf 562 Oil | 60 cps | 394° C.* | very slow > 5000 min. |
| Diisodecyl Phthalate | 88 cps | 410° C. | very slow > 5000 min. |
| Tricresyl Phosphate | 104 cps | 420° C. | very slow > 5000 min. |

*Average boiling point of boiling point range.

SOURCES FOR MATERIALS & DATA

Mineral Oils:
1. Penreco; Los Angeles, California
2. Magie Bros. Oil Company; Los Angeles, California Plasticizers and Solvents:
1. The Solvent and Chemical Companies; Los Angeles, California
2. Eastman Kodak; Kingsport, Tennessee Suitable lubricants are those usually included in ballpoint pen ink formulations and include fatty acids such as oleic, stearic and lauric acids.

Where hydrocarbon resins are shown, a suitable hydrocarbon resin is Nevchem 140 manufactured by Neville Chemical Company, Pittsburgh, Pennsylvania.

The following examples are illustrative of preferred embodiments but should not be construed in any way as limiting the present invention. In these examples components designated as volatile solvents have a boiling point less than 180° C. at atmospheric pressure and the non-volatile low viscosity solvents have a viscosity of 1–15 cps and a boiling point ranging from 180° C. to 300° C. The non-volatile substantially high viscosity solvent or plasticizer has a viscosity of 58 cps or more and a boiling point greater than 300° C. at atmospheric pressure.

| Components | Selected Type | % Amount by Weight |
|---|---|---|
| Elastomeric Polymer | Cis-1,4-Polyisoprene | 24 |
| Colorant | Pigment (50/50-alkali blue and victoria blue) | 18 |
| Volatile Solvent | Lacquer Diluent #6 | 28.5 |
| Non-volatile low viscosity solvent | 2257 Oil (1.5 cps) | 21 |
| Non-volatile substantially high viscosity solvent or plasticizer | Dioctyl Phthalate | 3.5 |
| Lubricants | Mixture of Oleic, Lauric and Stearic Acids (1,2,2) | 5 |
| | | 100 |

EXAMPLE II—COLOR BLUE

| Components | Selected Type | % Amount by Weight |
|---|---|---|
| Elastomeric Polymer | Cis-1,4-Polyisoprene | 22 |
| Colorant | Pigment (50/50-alkali blue and victoria blue) | 17 |
| Volatile Solvent | Lacquer Diluent #6 | 8 |
| Non-volatile low viscosity solvent | 2257 Oil (1.5 cps) | 49.5 |
| Non-volatile substantially high viscosity solvent or plasticizer | Heavy Mineral Oil (Gulf 562) | 2.5 |
| Lubricant | Oleic Acid | 1 |
| | | 100 |

EXAMPLE III—COLOR BLUE

| Components | Selected Type | % Amount by Weight |
|---|---|---|
| Elastomeric Polymer | Cis-1,4-Polyisoprene | 24 |
| Colorant | Pigment (50/50-alkali blue and victoria blue) | 18 |
| Volatile Solvent | Lacquer Diluent #6 | 8 |
| Non-volatile low viscosity solvent | 2257 Oil (1.5 cps) | 30 |
| Non-volatile substantially high viscosity solvent or plasticizer | Dioctyl Phthalate | 14 |
| Lubricant | Oleic Acid | 2 |
| Other | Hydrocarbon Resin | 4 |
| | | 100 |

EXAMPLE IV—COLOR RED

| Components | Selected Type | % Amount by Weight |
|---|---|---|
| Elastomeric Polymer | Cis-1,4-Polyisoprene | 23.5 |
| Colorant | Pigment (Red 2B) | 20.5 |
| Volatile Solvent | Lacquer Diluent #6 | 19 |
| Non-volatile low viscosity solvent | Magie 543 Oil (1.6 cps) | 34.5 |
| Non-volatile substantially high viscosity solvent or | | |

-continued

| Components | Selected Type | % Amount by Weight |
|---|---|---|
| plasticizer | — | 0 |
| Lubricants | Mixture of Oleic, Lauric and Stearic Acids (0.5,1,1) | 2.5 |
| | | 100 |

EXAMPLE V—COLOR BLUE

| Components | Selected Type | % Amount by Weight |
|---|---|---|
| Elastomeric Polymer | Cis-1,4-Polyisoprene | 23 |
| Colorant | Pigment (50/50-alkali blue and victoria blue) | 16.5 |
| Volatile Solvent | Lacquer Diluent #6 | 22 |
| Non-volatile low viscosity solvent | 2257 Oil | 35.2 |
| Non-volatile substantially high viscosity solvent or plasticizer | — | 0 |
| Lubricants | 50/50-Oleic and Lauric Acids | 3.3 |
| | | 100 |

EXAMPLE VI—COLOR BLUE

| Components | Selected Type | % Amount by Weight |
|---|---|---|
| Elastomeric Polymer | 50/50-Natsyn 2205 and SMR 5CV60 | 23.2 |
| Colorant | Pigment (50/50-alkali blue and victoria blue) | 18.1 |
| Volatile Solvent | Lacquer Diluent #6 | 20.5 |
| Non-volatile low viscosity solvent | 2257 Oil | 26.3 |
| Non-volatile substantially high viscosity solvent or plasticizer | Gulf 562 Oil | 4.9 |
| Lubricants | Mixture of Oleic, Lauric and Stearic Acids (0.5,1,1) | 2.5 |
| Other | Hydrocarbon Resin | 4.5 |
| | | 100.0 |

EXAMPLE VII—COLOR BLACK

| Components | Selected Type | % Amount by Weight |
|---|---|---|
| Elastomeric Polymer | 50/50-Natsyn 2205 and SMR 5CV60 | 24.1 |
| Colorant | Pigment (80/20-carbon black and alkali blue) | 19.1 |
| Volatile Solvent | Lacquer Diluent #6 | 20 |
| Non-volatile low viscosity solvent | 2257 Oil | 26.2 |
| Non-volatile substantially high viscosity solvent or plasticizer | Gulf 562 Oil | 4.5 |
| Lubricants | Mixture of Oleic, Lauric and Stearic Acids (0.5,1,1) | 2.5 |
| Other | Hydrocarbon Resin | 3.6 |
| | | 100.0 |

EXAMPLE VIII—COLOR BLUE

| Components | Selected Type | % Amount by Weight |
|---|---|---|
| Elastomeric Polymer | Natsyn 2200 | 22 |
| Colorant | Pigment (50/50-Alkali blue and victoria blue) | 18 |
| Volatile Solvent | Lacquer Diluent #6 | 8 |
| Non-volatile low viscosity solvent | 2257 Oil | 42 |
| Non-volatile substantially high viscosity solvent or plasticizer | Gulf 562 Oil | 5 |
| Lubricant | Oleic Acid | 1 |
| Other | Hydrocarbon Resin | 4 |
| | | 100 |

EXAMPLE IX—COLOR RED

| Components | Selected Type | % Amount by Weight |
|---|---|---|
| Elastomeric Polymer | 50/50-Natsyn 2205 and SMR 5CV60 | 26 |
| Colorant | Pigment (Red 2B) | 19 |
| Volatile Solvent | Lacquer Diluent #6 | 19 |
| Non-volatile low viscosity solvent | 2257 Oil | 30.5 |
| Non-volatile substantially high viscosity solvent or plasticizer | Plasticizer (diisodecyl phthalate) | 3 |
| Lubricants | Mixture of Oleic, Lauric and Stearic Acids (0.5,1,1) | 2.5 |
| | | 100 |

EXAMPLE X—COLOR GREEN

| Components | Selected Type | % Amount by Weight |
|---|---|---|
| Elastomeric Polymer | 50/50-Natsyn 2205 and SMR 5CV60 | 24 |
| Colorant | Pigment-Phthalo Blue | 12 |
| | Diarylide Yellow | 7 |
| Volatile Solvent | Lacquer Diluent #6 | 19 |
| Non-volatile low viscosity solvent | 2257 Oil | 29 |
| Non-volatile substantially high viscosity solvent or plasticizer | Gulf 562 Oil | 3.5 |
| Lubricants | Mixture of Oleic, Lauric and Stearic Acids (0.5,1,1) | 2.5 |
| Other | Hydrocarbon Resin | 3 |
| | | 100 |

EXAMPLE XI—COLOR BLUE BLACK

| Components | Selected Type | % Amount by Weight |
|---|---|---|
| Elastomeric Polymer | Cis-1,4-Polyisoprene | 23.5 |
| Colorant | Pigment-Carbon Black | 17 |
| | Alkali Blue | 5 |
| Volatile Solvent | Lacquer Diluent π6 | 18 |
| Non-volatile low viscosity solvent or plasticizer | Kodaflex TXIB | 10 |
| | 2251 Oil | 10 |
| | 2257 Oil | 9.5 |
| Non-volatile substantially high viscosity | | |

| Components | Selected Type | % Amount by Weight |
|---|---|---|
| solvent or plasticizer | Dioctyl Phthalate | 4.5 |
| Lubricants | Mixture of Oleic, Lauric and Stearic Acids (0.5,1,1) | 2.5 |
| | | 100 |

EXAMPLE XII—COLOR BLUE

| Components | Selected Type | % Amount by Weight |
|---|---|---|
| Elastomeric Polymer | Natsyn 2200 | 24 |
| Colorant | Pigment (victoria blue) | 11 |
| Volatile Solvent | Lacquer Diluent #6 | 30 |
| Non-volatile low viscosity solvent | 2257 Oil | 33 |
| Non-volatile substantially high viscosity solvent or plasticizer | — | 0 |
| Lubricant | Oleic Acid | 2 |
| | | 100 |

The ballpoint pen inks of this invention are more viscous than the customary glycol based ballpoint pen inks and therefore are more suitable for use in a pressurized cartridge. The exact pressure required will be dependent upon the opening between the ball and lip of the point used, the viscosity range of the final ink composition, and the amount of ink and volume of the tube used to contain the ink. It has been found that one desirable ink pressure medium is compressed air.

The pressurized cartridge utilizes a solid piston that is positioned on top of the ink supply and forwardly of the pressure producing medium. The follower has a central section that is cylindrical in shape and has its two ends formed as conical portions so that no specific orientation in assembly is required.

It is to be understood that the form of the invention herein above shown and described is to be taken as the preferred examples of the same, and that various changes in the components and the quantities thereof may be resorted to, without departing from the spirit of the invention or scope of the appended claims.

I claim:

1. In a ball point writing instrument containing an ink capable of depositing a trace on an absorbent, paper-like writing surface having minute voids therein, said trace being characterized by initial erasability thereof by ordinary pencil erasers and thereafter developing permanence over a period of time; said ink comprising an elastomer selected from the group consisting of natural rubbers, a synthetic rubber which essentially duplicates the chemical structure of natural rubber, and mixtures thereof, pigment, and a solvent system for said elastomer, said elastomer being present in the range of about 18–28% by weight of the ink, said pigment being present in the range of about 10–22% by weight of the ink, said solvent system comprising a volatile component present in the range of about 8–30% by weight of the ink and having a boiling point less than about 180° C. and an essentially non-volatile component being present in the range of about 21–50.5% by weight of the ink and having a boiling point less than about 300° C. and greater than about 180° C.

2. In a ball point writing instrument as defined in claim 1 wherein said ink includes up to 15% by weight of the ink composition of a high viscosity material having a boiling point greater than 300° C.

3. In a ball point writing instrument as defined in claim 1 or 2 wherein said elastomer has a substantially uniform molecular weight distribution over the molecular weight range of about 100,000 to about 900,000.

4. In a ball point writing instrument as defined in claim 1 wherein said essentially non-volatile component has a viscosity within the range of about 1 to about 15 cps.

5. In a ball point writing instrument as defined in claim 2 wherein said high viscosity material has a viscosity of at least about 58 cps.

6. In a ball point writing instrument containing an ink capable of depositing a trace on an absorbent, paper-like writing surface having minute voids therein, said trace being characterized by initial erasability thereof by ordinary pencil erasers and the capability of developing permanence over a period of time, said ink comprising pigment which is present in the range of about 10–22% by weight of the ink, an elastomer, said elastomer being selected from the group consisting of natural rubbers, a synthetic rubber which essentially duplicates the chemical structure of natural rubber, and mixtures thereof, and being present in the range of about 18–28% by weight of the ink, and a solvent system therefor, said solvent system comprising a volatile component present in the range of about 8–30% by weight of the ink and an essentially non-volatile component present in the range of about 21–50.5% by weight of the ink and in which the volatile component has a boiling point less than about 180° C. and said essentially non-volatile component having a viscosity within the range of about 1 to 15 cps and a boiling point less than 300° C. and greater than about 180° C.

7. In a ball point writing instrument as defined in claim 6 wherein said elastomer comprises a mixture of natural rubbers and a synthetic rubber which essentially duplicates the chemical structure of natural rubber, in approximately equal amounts.

8. In a ball point writing instrument as defined in claim 1 or 6 wherein said essentially non-volatile component is a hydrocarbon oil.

9. In a ball point writing instrument containing an ink capable of depositing a trace on an absorbent, paper-like writing surface having minute voids therein, said trace being characterized by initial erasability thereof by ordinary pencil erasers and the capability of developing permanence over a period of time said ink comprising an elastomer selected from the group consisting of natural rubbers, a synthetic rubber which essentially duplicates the chemical structure of natural rubber, and mixtures thereof, said elastomer being present in amount of at least 18% by weight of the ink, pigment which is present in amount of at least 10% by weight of the ink, and a solvent system for said elastomer, said solvent system comprising a volatile component and an essentially non-volatile component, said volatile component having a boiling point less than about 180° C. and being present in an amount of at least 8% by weight of the ink, and said essentially non-volatile component having a boiling point less than 300° C. and above 180° C. and being present in an amount at least 21% by weight of the ink.

10. In a ball point writing instrument as defined in claim 9 wherein said essentially non-volatile component is a low viscosity hydrocarbon oil.

11. In a ball point writing instrument as defined in claim 10 wherein said hydrocarbon oil has a viscosity within the range of about 1 to about 15 cps.

12. In a ball point writing instrument as defined in claim 9 wherein said volatile component is present in the range of about 8–30% by weight of the ink.

13. In a ball point writing instrument as defined in claim 9 wherein said essential non-volatile component is present in the range of about 21 to 50.5% by weight of the ink.

14. In a ball point writing instrument as defined in claim 9 wherein said pigment is present in the range of about 10–22% by weight of the ink.

15. In a ball point writing instrument as defined in claim 9 wherein said elastomer is present in the range of about 18–28% by weight of the ink.

16. In a ball point writing instrument as defined in claim 9 wherein said elastomer has a substantially uniform molecular weight distribution over the molecular weight range of about 100,000 to about 900,000.

17. In a ball point writing instrument as defined in claim 9 wherein said solvent system further comprises up to 15% by weight of the ink composition of a non-volatile high viscosity material having a boiling point greater than 300° C.

18. In a ball point writing instrument as defined in claim 17 wherein said non-volatile high viscosity material has a viscosity of at least about 58 cps.

19. In a ball point writing instrument as defined in claim 9 wherein said elastomer comprises a mixture of natural rubbers and a synthetic rubber which essentially duplicates the chemical structure of natural rubber in approximately equal amounts.

20. In a ball point writing instrument as defined in claim 9 wherein said essentially non-volatile component is a low viscosity essential oil.

21. In a ball point writing instrument as defined in claim 9 wherein said essentially non-volatile component is a low viscosity petroleum derivative.

22. In a ball point writing instrument as defined in claim 9 wherein said essentially non-volatile component is a low viscosity plasticizer.

* * * * *